July 7, 1959

R. L. CURTNER 2,893,530

PULL TYPE MAGNETIC TORQUE LIMITER

Filed May 28, 1956

INVENTOR.
RICHARD L. CURTNER

BY *Williams & Tilberry*

ATTORNEYS

INVENTOR.
RICHARD L. CURTNER
BY
ATTORNEYS

United States Patent Office 2,893,530
Patented July 7, 1959

2,893,530

PULL TYPE MAGNETIC TORQUE LIMITER

Richard L. Curtner, Canton, Ohio, assignor to E. W. Bliss Company, Canton, Ohio, a corporation of Delaware Application May 28, 1956, Serial No. 587,879

10 Claims. (Cl. 192—150)

This invention relates to overload protective devices for crankshaft driven machinery, and in particular to torque limiting overload couplings for machines, such as industrial power presses and the like, whose torque characteristics vary during the operating cycle of the machine.

As is set forth more fully in my co-pending application entitled Overload Coupling, Serial No. 546,155, filed November 10, 1955, the force that can be developed to do work with a crank-type machine is a function of the crankshaft angular position at which a work load is engaged and the magnitude of torque which is applied to the crankshaft. The maximum load which can be developed is equal to the applied torque divided by the effective lever arm of the crankshaft. Otherwise stated, with constant applied torque, the maximum load is inversely proportional to the effective lever arm. It follows, therefore, that because of the rapidly decreasing effective lever arm of the crank, as the press slide approaches the bottom of its stroke, progressively less torque is required to develop a load capable of damaging the press. Thus, it is a corollary that the torque sufficient at any given instant to produce a press damaging load, hereinafter referred to as an "overload," varies with the crankshaft angle at which such overload is encountered.

An overload protective device must be located in the drive train to disconnect the crankshaft from the source of input torque whenever an overload occurs. However, the overload protective device must also be able at all times to transmit sufficient torque to maintain the press rated load tonnage and yet be responsive to any damaging overload which occurs at any point in the operating cycle. These requirements thus call for an overload coupling whose disengagement torque varies in response to the crankshaft angular position.

Although the coupling of the present invention is partly mechanical and partly electromagnetic in operation, there is no direct mechanical connection since all of the torque is transmitted by magnetic force and it is supplemented with a control circuit to regulate its torque transmitting capacity. Once the coupling has started to separate from the overload condition, the press frame members must absorb all residual energy of momentum from the crankshaft connected moving parts in the form of additional tonnage over and above the existing tonnage on the press the moment before the coupling starts to separate. It is desirable, therefore, to locate the coupling in the gear drive on the crankshaft, whenever possible, in preference to the intermediate shaft or back shaft. This crankshaft location minimizes flywheel effect on the crankshaft after an overload has been detected and provides a system with the least residual energy of momentum. The coupling is arranged in such a manner between the drive gear rim and drive gear hub that torque can be transmitted between these two said members by direct pull type electromagnetic principles of operation. Thus, in accordance with the invention, the coupling yields in direct magnetic pull due to an overload condition in the press.

It is therefore, an object of this invention to protect crankshaft driven machinery in a novel manner at all points in the cycle of operation while supplying the full amount of torque necessary to produce the rated tonnage. It is a further object of this invention to produce an overload coupling which will quickly and completely disengage the crankshaft from the driving mechanism without mechanical friction. It is a further object of this invention to provide a novel overload coupling which may be mounted on the crankshaft so as to minimize the flywheel effect on the crankshaft of the residual energy of momentum after the overload coupling has been disengaged. It is a still further object of this invention to provide an overload coupling which after disengagement can be reset by operation of standard press controls without separate electrical reset circuits. It is a still further object of this invention to provide an overload coupling which will prevent fall of the press slide in the event of a power failure. It is also an object of this invention to provide a magnetic pull-type overload coupling without direct mechanical connection wherein the entire torque is transmitted by magnetic force, the field strength of which may be regulated in response to the crankshaft angular position. It is a further object to provide an overload coupling which operates without axial motion. It is a still further object of this invention to provide an overload coupling which is readily adapted to present installations without requiring extensive rebuilding of the presses.

Other objects and advantages of the invention will be apparent from the following detailed description thereof with reference to the accompanying drawings, in which.

Figure 3:
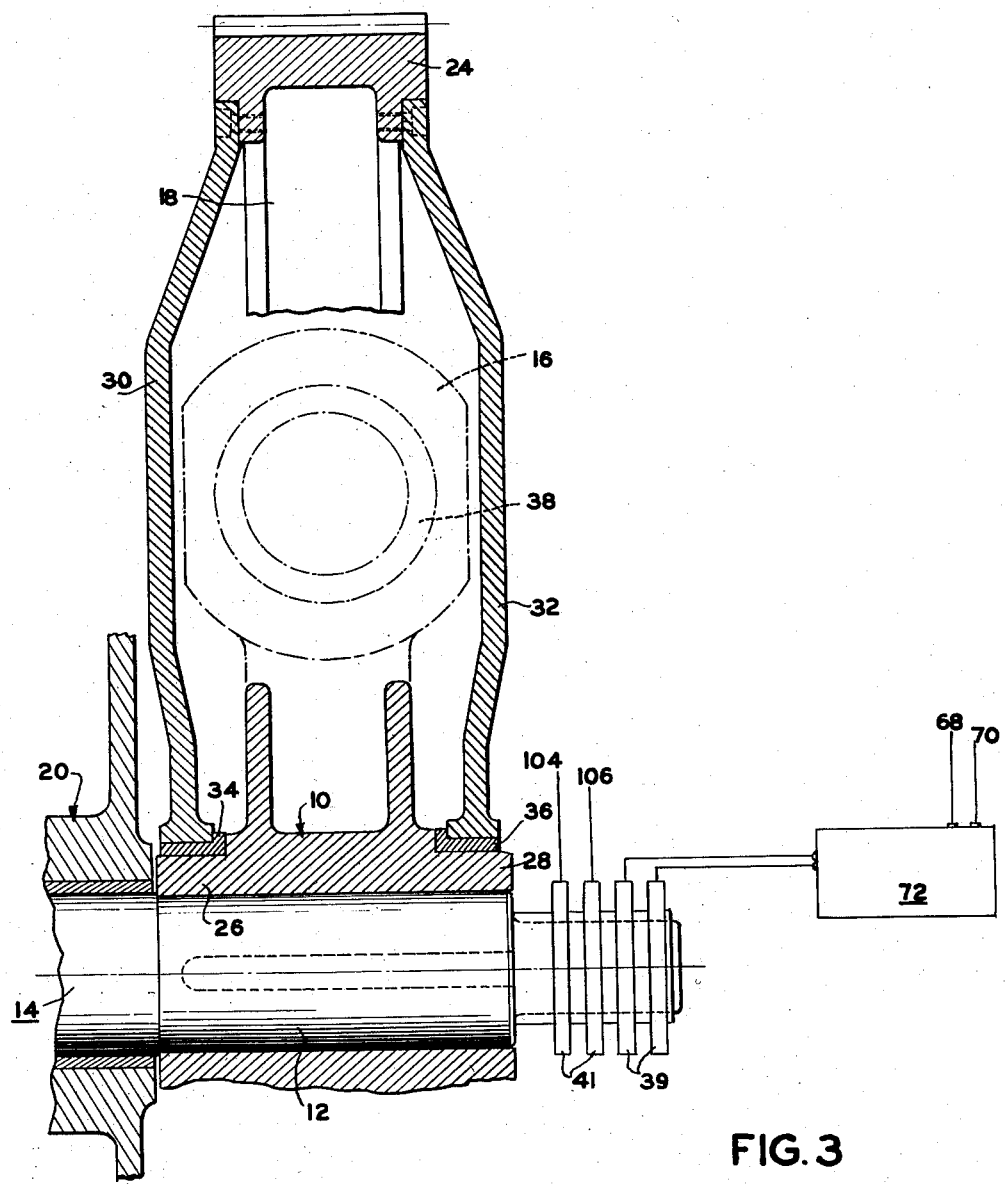
Figure 3 is a fragmentary sectional view taken substantially on line 3—3 of Figure 2.

Reference will now be made to the drawings in greater detail. The preferred embodiment of the invention comprises a sleeve-like hub 10 (see Figure 3) adapted to be secured to and fit over the outboard end 12 of the crankshaft 14 of a press 20. The hub 10 is provided with a plurality of outwardly extending lugs 16, and although four lugs are shown in the drawings, other numbers of lugs may be utilized successfully. A drive gear 24 is also mounted on the outboard end 12 of the crankshaft 14 concentric with the hub 10 and idly journaled on sleeve extensions 26 and 28 of said hub member 10 by means of a pair of spider members 30 and 32. The spider members are provided with bushings 34 and 36 fitted over the opposite sleeve extensions 26 and 28 of the hub 10 to reduce friction and wear. Gear 24 is also provided with a plurality of inwardly extending lugs 18 adapted to partially overlap the outwardly extending hub lugs 16 respectively.

Figure 1:
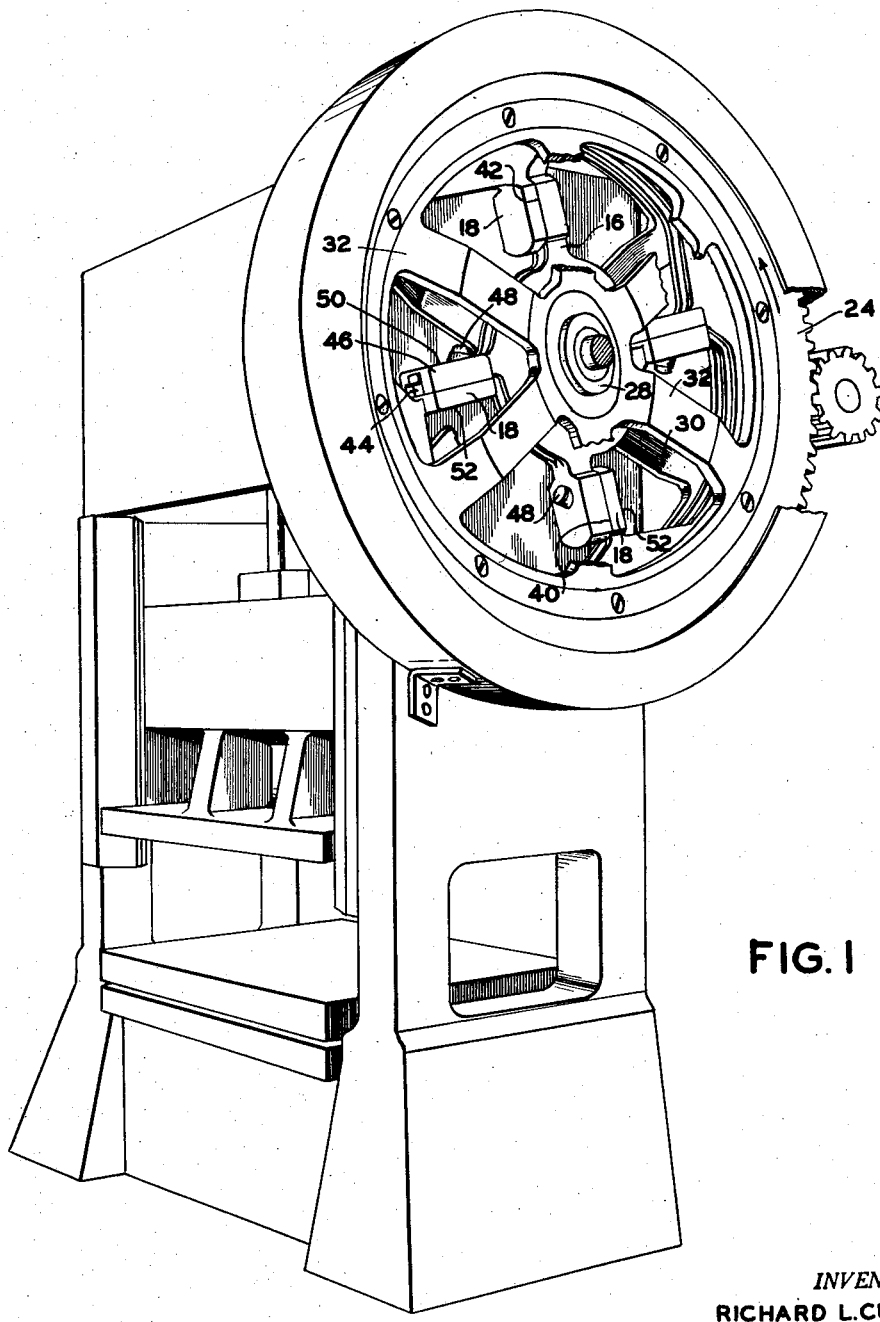
Figure 1 is a perspective view of a preferred embodiment of the invention as seen on an industrial power press.
Figure 2:
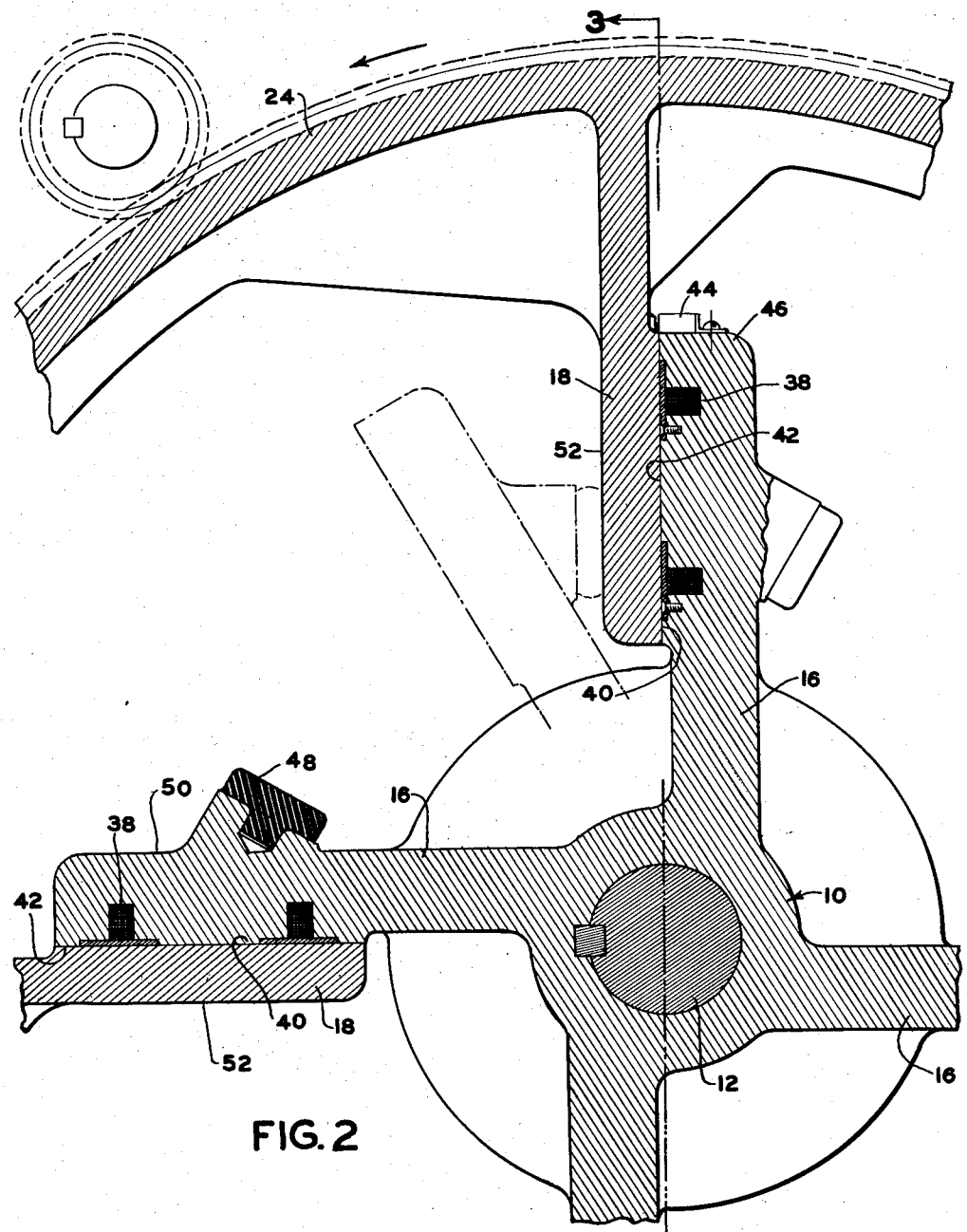
Figure 2 is a fragmentary elevational view in section of a preferred embodiment of the invention.

Electromagnetic coils 38 are recessed in the outer portions of said hub lugs 16, and pairs of slip rings 39 and 41 are secured to the outboard end 12 of the crankshaft 14 to provide electrical connections to the electromagnetic coils and to the brake actuating limit switch 44, respectively. Lines 104 and 106 in turn connect slip rings 41 to the clutch control panel 90 (see Figure 4). The mating portions of the gear lugs 18 and the hub lugs 16 are machined to provide matching opposed flat surfaces 40 and 42 adapted to make co-planar contact therebetween. The electromagnetic coils may be mounted in either the hub lugs 16 or the gear lugs 18; however, it has been found to be most convenient to locate the electromagnetic coils as shown. A limit switch 44 is mounted on the outer end 46 of at least one of the hub lugs 16 (see Figure 1) and is adapted to break the electrical circuit which deenergizes the clutch control panel 90 to apply the brake unit as described more fully hereinbelow, when the co-planar machined surfaces 40 and 42 of the hub lugs 16 and the gear lugs 18 are separated. Such a separation would normally occur when the electromagnetic attraction holding these two surfaces in contact is overcome by a press load requiring a greater torque than the torque transmitting capacity between the drive gear 24 and the hub member 10.

From the overlapping position of the hub and gear lug members 16 and 18, respectively, as shown in the drawings, the gear lugs may travel approximately 60° before contact is made with the resilient pad 48 on back surface 50 of the hub lug members. This 60° arc of free travel in the coupling normally provides a sufficient time period for the standard press brake to stop the driving portion of the gear train. To reduce mechanical shock loads, resilient cushions or pads 48 are fastened to the back surfaces 50 of the hub lugs to receive the impact of the back surfaces 52 of the gear lugs 18 should the press recoil, after the coupling has disengaged, and impart a momentum to the crankshaft in an opposite direction.

For the reset operation, the gear lugs 18 are rotated in the reverse direction to contact the hub lugs 16, and the electromagnetic coils 38 are energized to hold these surfaces in firm contact. Energization of the electromagnetic coils 38 enables the drive gear 24 to pull the hub lugs 16 rotatably thereafter, when the gear is rotated in the forward direction.

Figure 4:
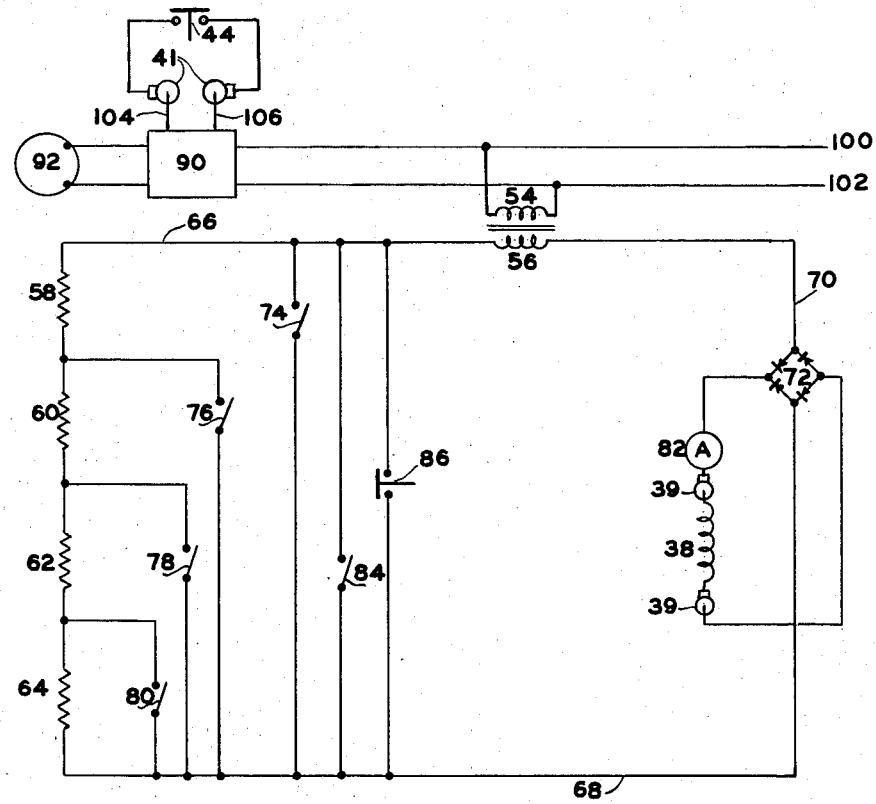
Figure 4 is an electrical schematic diagram showing a control circuit used with a preferred embodiment of this invention.

The current flow through the electro-magnetic coils is regulated by a current control circuit such as is shown in Figure 4. Power is supplied to this circuit from power lines 100 and 102 by transformer 54. The secondary 56 of this transformer is connected by line 66 through series resistors 58, 60, 62 and 64 and then by line 68 to a full wave bridge rectifier 72. Line 70 connects rectifier 72 back to secondary 56 to complete the circuit. A series of drum switches 74, 76, 78, and 80, which are synchronized with the crankshaft rotation to close consecutively in predetermined order, is connected across the resistors in such a manner that switch 80 shunts resistor 64, switch 78 shunts resistors 62 and 64, switch 76 shunts resistors 60, 62 and 64 and switch 74 shunts the entire bank of resistors. An ammeter 82 and the electromagnetic coils 38 are connected across the output of rectifier 72.

At the beginning of a cycle with the crankshaft at top center, switches 74, 76, 78 and 80 are closed so that all resistors are shunted. Full voltage is thus applied across rectifier 72 and hence the maximum value of current flows through the electromagnetic coils 38. This allows the coupling to transmit the full value of torque necessary to overcome inertia during the first part of the stroke. As the crankshaft reaches some predetermined point, such as the 150° position, near the bottom of the stroke, drum switch 74 opens, thereby placing resistor 58 in series with rectifier 72. This results in a decrease in the voltage supplied to the rectifier and a consequent decrease in current supplied to the coils 38 which also reduces the torque transmitting capacity of the coupling. As the crankshaft continues towards bottom center, at preset positions drum switches 76, 78, and 80 are opened in turn. This adds resistors 60, 62, and 64, respectively, in series with the rectifier, thereby stepwise reducing the current in coils 38. Thus the coupling is able to transmit a definite maximum amount of torque down to the position where switch 74 opens. From this point down to bottom center the torque transmitting capacity is reduced in a series of steps down to a minimum safe value which will not allow the press to be overloaded.

After the crankshaft had passed bottom center the danger of overload is normally passed and a greater magnitude of torque is preferred to quickly raise the slide and return the crankshaft to top center. Therefore, at bottom center drum switch 84 closes, shunting out all of the resistors and restoring the current in coils 38 to a maximum.

Since the torque requirements for jog operation exceed the torque requirements of the rated load at points near the bottom of the stroke when any of the resistors 58, 60, 62 and 64 are in the circuit, it is necessary to provide means to disconnect the drum switch portion of the circuit during jog operations. A switch 86 is provided to be actuated by the jog controls, which shorts out the resistor bank independently of the operation of the drum switches.

When an overload is encountered in excess of the capacity of the press, the overlapping hub and gear lugs, 16 and 18 respectively, separate, whereby limit switch 44 opens and deenergizes clutch control panel 90 and consequently solenoid 92 (see Figure 4). Solenoid 92 being deenergized then disengages the clutch and engages the spring set brake to bring the gear train to a stop. After the condition causing the overload has been corrected, the overload coupling is reset by merely rotating the drive gear 24 in a reverse direction until the faces 40 and 42 of respective hub lugs 16 and gear lugs 18 are once again in co-planar contact, and limit switch 44 is closed. The electromagnetic coils 38 are then energized and the press is once more in a condition to continue its work stroke.

While only one embodiment of the invention has been described hereinabove, it will be understood that modification thereof may be made within the spirit and scope of the invention as set forth in the appended claims.

I claim:

1. An overload coupling comprising a hub adapted to be drivingly connected to a crankshaft; a first lug rigidly secured to said hub and projecting radially outwardly therefrom; a gear adapted to be idly mounted on said crankshaft concentric with said hub; a second lug rigidly secured to said gear and projecting radially inwardly from the periphery of said gear to overlap said hub lug, said second lug being forward of said first lug as determined by the direction of rotation of said coupling; an electromagnetic coil secured to one of said lugs; means to energize said coil to produce a magnetic attraction between said overlapping lugs; and means to rotate said gear in a direction whereby said gear lug pulls said hub lug to rotate said crankshaft when said electromagnetic coil is energized.

2. The overload coupling set forth in claim 1 including means to variably regulate the current flow in said magnet coil to maintain a magnetic attraction between the members of said coupling sufficient to transmit torque less than a predetermined torque limit which varies during a cycle of operation of a machine driven by said coupling.

3. A coupling for protecting from damage due to overload a power driven machine having the characteristics of being susceptible to such damage only at driving torques above a torque limit which changes during the working stroke of a cycle of operation of the machine, said coupling comprising: a hub adapted to be drivingly connected to a crankshaft; a first lug rigidly secured to said hub and projecting radially outwardly therefrom; a gear adapted to be idly mounted on said crankshaft concentric with said hub; a second lug rigidly secured to said gear projecting radially inwardly from the periphery of said gear to overlap said hub lug, said second lug being forward of said first lug as determined by the direction of rotation of said gear; an electromagnetic coil secured to one of said lugs; means to energize said coil to produce a magnetic attraction between said overlapping lugs; means to rotate said gear in a direction whereby said gear lug pulls said hub lug to rotate said crankshaft when said electromagnetic coil is energized; and means to control the current flow in said electromagnetic coil so that said coupling transmits torque less than a predetermined torque limit which varies during a cycle of operation of a machine driven by said coupling.

4. The overload coupling set forth in claim 3 including limit switch means adapted to deenergize the gear rotating means when the torque requirements of load exceed the torque capacity of the coupling.

5. In combination with a clutch and brake mounted on a machine, an overload coupling comprising: a hub adapted to be drivingly connected to a crankshaft; a lug rigidly secured to said hub and projecting outwardly therefrom; a drive gear adapted to be idly mounted on said crankshaft concentric with said hub; a lug rigidly secured to said drive gear and projecting inwardly from the periphery of said gear to overlap said hub lug; an electromagnetic coil secured to one of said lugs; means to energize said coil to produce a magnetic attraction between said overlapping lugs; means driven by said press clutch to rotate said gear in a direction whereby said gear lug pulls said hub lug to rotate said crankshaft when said electromagnetic coil is energized; means to de-energize said clutch when the magnetic attraction between said overlapping lugs is overcome due to an overload on the crankshaft; and means to set the brake when the clutch is de-energized, to prevent further rotation of said gear.

6. An overload coupling as set forth in claim 5 including a cushion secured to the back surface of one of said lugs adapted to cushion the back surface of said gear lug in recoil when the magnetic attraction between said overlapping lugs is overcome.

7. A coupling adapted to disengage if the applied torque exceeds a predetermined magnitude, comprising: a rotatable outer member; a rotatable inner member concentric with said outer member; a first lug projecting radially inwardly from said outer member; a second lug projecting radially outwardly from said inner member, said lugs being in overlapping mating contact, said second lug being forward of said first lug as determined by the direction of rotation of said outer member; an electromagnetic coil attached to one of said lugs; and means to energize said coil to produce a magnetic attraction between said lugs wherein torque is applied to one of said lugs, whereby torque applied to one of said members is transmitted to the other member by said magnetic attraction.

8. A coupling for protecting from damage due to overload a power driven machine having the characteristics of being susceptible to such damage only at driving torques above a torque limit which changes during the working stroke of a cycle of operation of the machine, said coupling comprising: a hub adapted to be drivingly connected to a crankshaft; a lug rigidly secured to said hub and projecting outwardly therefrom; a gear adapted to be idly mounted on said crankshaft concentric with said hub; a lug rigidly secured to said gear projecting inwardly from the periphery of said gear to overlap said hub lug; an electromagnetic coil secured to one of said lugs; means to energize said coil to produce a magnetic attraction between said overlapping lugs; means to rotate said gear in a direction whereby said gear lug pulls said hub lug to rotate said crankshaft when said electromagnetic coil is energized; means to control the current flow in said electromagnetic coil so that said coupling transmits torque less than a predetermined torque limit which varies during a cycle of operation of a machine driven by said coupling; and cushion means secured to the back surface of said hub lug adapted to cushion the back surface of said gear lug in recoil when the torque transmitted by said gear to said hub lug is overcome by the countertorque of said hub.

9. In combination with a clutch and brake mounted on a machine, an overload coupling comprising: a hub adapted to be drivingly connected to a crankshaft; a plurality of lugs secured to said hub and evenly spaced apart to project radially outwardly from said hub; a drive gear adapted to be idly mounted on said crankshaft concentric with said hub; a plurality of lugs rigidly secured to said drive gear and evenly spaced apart to project radially inwardly from the periphery of said gear to overlap said hub lugs; electromagnetic coils secured to one of each of said overlapping lugs; means to energize said coils to produce a magnetic attraction between each of said pair of overlapping lugs; means driven by said press clutch to rotate said gear in a direction whereby said gear lugs pull said hub lugs to rotate said crankshaft when said electromagnetic coils are energized; means to de-energize said clutch when the magnetic attraction between said overlapping lugs is overcome due to an overload on the crankshaft; and means to set the brake when the clutch is de-energized to prevent further rotation of said gear.

10. A coupling adapted to disengage if the applied torque exceeds a predetermined magnitude, comprising: a rotatable outer member; a rotatable inner member concentric with said outer member; a first plurality of lugs evenly spaced apart and projecting radially inwardly from said outer member; a second plurality of lugs evenly spaced apart and projecting radially outwardly from said inner member; said first plurality of lugs being in overlapping mating contact with said second plurality of lugs, said first plurality of lugs being forward of said corresponding second plurality of lugs; and electromagnetic coil attached to one of each pair of overlapping lugs; and means to energize said coils to produce magnetic attraction between said overlapping lugs, whereby torque applied to one of said members is transmitted to the other member by magnetic attraction between overlapping lugs.

References Cited in the file of this patent

UNITED STATES PATENTS

| | | |
|---|---|---|
| 1,297,236 | Peiler | Mar. 11, 1919 |
| 1,909,156 | Williams et al. | May 16, 1933 |
| 2,362,343 | Bath | Nov. 7, 1944 |
| 2,644,563 | Crary | July 7, 1953 |
| 2,717,977 | Decker | Sept. 13, 1955 |
| 2,748,322 | Oswald | May 29, 1956 |

FOREIGN PATENTS

| | | |
|---|---|---|
| 441,030 | France | May 17, 1912 |
| 835,675 | Germany | Apr. 3, 1952 |
| 526,879 | Belgium | Mar. 31, 1954 |